United States Patent
Marpe et al.

(10) Patent No.: US 8,446,960 B2
(45) Date of Patent: May 21, 2013

(54) PICTURE CODING USING ADAPTIVE COLOR SPACE TRANSFORMATION

(75) Inventors: Detlev Marpe, Berlin (DE); Thomas Wiegand, Berlin (DE); Peter Kauff, Berlin (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 1254 days.

(21) Appl. No.: 12/159,802

(22) PCT Filed: Feb. 13, 2006

(86) PCT No.: PCT/EP2006/001292
§ 371 (c)(1),
(2), (4) Date: Jul. 18, 2008

(87) PCT Pub. No.: WO2007/079781
PCT Pub. Date: Jul. 19, 2007

(65) Prior Publication Data
US 2009/0168894 A1 Jul. 2, 2009

(30) Foreign Application Priority Data
Jan. 13, 2006 (WO) ............... PCT/EP2006/000286

(51) Int. Cl.
*H04N 7/12* (2006.01)
(52) U.S. Cl.
USPC ............................... 375/240.18; 375/240.24
(58) Field of Classification Search
USPC ....................... 375/240.18, 240.24
See application file for complete search history.

(56) References Cited

U.S. PATENT DOCUMENTS

| 4,974,171 | A | | 11/1990 | Yeh et al. |
| 5,144,424 | A | * | 9/1992 | Savatier .................... 375/240.03 |
| 5,253,055 | A | * | 10/1993 | Civanlar et al. .......... 375/240.24 |
| 5,533,173 | A | * | 7/1996 | Wober et al. ................. 358/1.15 |
| 5,668,890 | A | * | 9/1997 | Winkelman .................... 382/167 |
| 5,671,298 | A | * | 9/1997 | Markandey et al. .......... 382/298 |

(Continued)

FOREIGN PATENT DOCUMENTS

| JP | 2002-247375 | A | 8/2002 |
| JP | 2004-112566 | A | 4/2004 |
| WO | 2007/079781 | A1 | 7/2007 |

OTHER PUBLICATIONS

Rijsselbergen, Dieter Van. YCoCg(-R) Color Space Conversion on the GPU. Sixth FirW PhD Symposium. Ghent University. Nov. 30, 2005.*

(Continued)

*Primary Examiner* — Hassan Kizou
*Assistant Examiner* — Ashil Farahmand
(74) *Attorney, Agent, or Firm* — Keating & Bennett, LLP (57) ABSTRACT

The present invention is based on the finding that pictures or a picture stream can be encoded highly efficient when a representation of pictures is chosen that is having different picture blocks, wherein each picture block is carrying picture information for picture areas smaller than the full area of the picture and when the different picture blocks are carrying the picture information either in a first color-space representation or in a second color-space-representation. Since different color-space-representations have individual inherent properties with respect to their describing parameters, choosing an appropriate color-space-representation individually for the picture blocks results in an encoded representation of pictures that is having a better quality at a given size or bit rate.

26 Claims, 8 Drawing Sheets

U.S. PATENT DOCUMENTS

| | | | |
|---|---|---|---|
| 6,023,527 | A | 2/2000 | Narahara |
| 6,094,454 | A * | 7/2000 | Mitchell et al. ............ 375/240.18 |
| 2003/0035127 | A1* | 2/2003 | Nakami ............................ 358/1.9 |
| 2003/0108250 | A1* | 6/2003 | Luo et al. ......................... 382/263 |
| 2005/0129130 | A1* | 6/2005 | Shen et al. ................ 375/240.24 |
| 2005/0195900 | A1 | 9/2005 | Han |
| 2005/0259730 | A1* | 11/2005 | Sun ............................ 375/240.03 |
| 2005/0265449 | A1* | 12/2005 | Yoon .......................... 375/240.12 |
| 2007/0065005 | A1 | 3/2007 | Cha et al. |
| 2009/0168894 | A1* | 7/2009 | Marpe et al. .............. 375/240.24 |
| 2011/0001642 | A1 | 1/2011 | Yu et al. |

OTHER PUBLICATIONS

Official communication issued in counterpart International Application No. PCT/EP2006/001292, mailed on May 25, 2007.

Marpe et al.: "MB-Adaptive Residual Color Transform for 4:4:4 Coding," XP-002433332; Joint Video Team (JVT) of ISO/IEC MPEG & ITU-T VCEG; 18th Meeting: Bangkok, Thailand; Jan. 14-20, 2006; pp. 1-14.

"Advanced Video Coding for Generic Audiovisual Services," International Telecommunication Union; ITU-T Recommendation H.264; Mar. 2005; 343 pages.

Reichel et al.: "Scalable Video Coding-Join Draft 4," Joint Video Team (JVT) of ISO/IEC MPEG & ITU-T VCEG; 17th Meeting:; Nice, France; Oct. 2005; pp. 1-137.

Reichel et al.: "Joint Scalable Video Model JSVM-4," XP-002393742; Joint Video Team (JVT) of ISO/IEC MPEG & ITU-T VCEG; 17th Meeting: Nice, France; Oct. 2005; pp. 1-41.

Winken et al.: "Adaptive Motion Refinement for FGS Slices," XP-002419224; Joint Video Team (JVT) of ISO/IEC MPEG & ITU-T VCEG; 17th Meeting: Nice, France; Oct. 2005; pp. 1-5.

Hinz et al.: "FDS for Field Pictures and MBAFF Frames," XP-002434241; Joint Video Team (JVT) of ISO/IPEC MPEG & ITU-T VCEG; URL:http;//ftp3.itu.ch/av-arch/jvt-site/20 06_01_Bangkok/JVT-R062.zip; 18th Meeting: Bangkok, Thailand; Jan. 14-20, 2006; pp. 1-7.

Reichel et al.: "Draft of Joint Scalable Video Model JSVM-4 ANNEX G." XP-002422832; Joint Video Team (JVT) of ISO/IEC MPEG & ITU-T VCEG; 17th Meeting: Nice, France; Oct. 2005; pp. 1-165.

Sullivan et al.: "Editors' Text for ISO/IEC 14496-10:2005 (AVC 3rd Edition)," XP-002434242; International Organisation for Standardisation; ISO/IEC JTC1/SC291WG11; Apr. 2005; pp. 1-318.

Hinz et al.: "First Concepts for Inter-Layer Prediction With MBAFF Frames," Joint Video Team (JVT) of ISO/IEC MPEG & ITU-T VCEG;18th Meeting: Bangkok, Thailand; Jan. 14-20, 2006; pp. 1-10.

Official Communication issued in corresponding Chinese Patent Application No. 200680050961.7, mailed on Sep. 6, 2011.

English translation of Official Communication issued in corresponding Chinese Patent Application No. 200680050961.7, issued on Mar. 12, 2010.

English language translation of Official Communication issued in corresponding Japanese Patent Application No. 2008-549767, mailed on Jan. 5, 2011.

Schwarz et al., "Coding Scheme Enabling Precision-Scalability," U.S. Appl. No. 11/854,375, filed Sep. 12, 2007.

\* cited by examiner

FIGURE 1

Rate-distortion performance (R-D) curves for encoding a single picture in fixed colour space representations and the corresponding target R-D envelope.

PICTURE CODING USING ADAPTIVE COLOR SPACE TRANSFORMATION

The present invention relates to picture coding and in particular to a concept allowing for a more efficient coding of picture content, i.e. producing encoded representations of pictures or picture streams having a better R/D-ratio.

BACKGROUND OF THE INVENTION

Applications where pictures or picture streams have to be encoded efficiently are numerous. For example, still image compression is normally done by digital photo cameras to increase the number of pictures that can be stored on a storage medium of a given size. When it comes to transmission of image sequences or complete movies over a transmission medium offering only limited bandwidth, the use of an efficient codec (coder-decoder) that allows for a high compression of the content of the pictures becomes even more urgent. This is on the one hand due to the desired transmission over transport channels offering low bandwidth, such as the streaming of video content to mobile phones. On the other hand, the transmission of high-resolution video content is becoming more and more popular since displays capable of displaying such high resolution pictures are spreading more and more amongst consumers. One major trend is the upcoming broadcast of high-definition television (HDTV).

In general, two different coding approaches may be distinguished, the first aiming for an encoding without any loss of information and the second accepting a (moderate) loss of information and quality to achieve a significant reduction in file sizes. Although lossless encoding techniques exist for both still images and movie content, these techniques, often based on entropy coding, cannot achieve a file-size reduction being sufficient or acceptable for the desired application. Therefore, lossy compression is mostly advantageous such as JPEG for still image compression and MPEG 2 for movie compression.

Generally, lossy compression has the problem of a decreased quality of the compressed pictures compared to the underlying original picture. Naturally, the quality of the picture becomes worse when the compression rate is increased, i.e. when the file size of the compressed picture is decreased. Therefore, one has to find a compromise between the desired quality of a compressed image and the file size acceptable for transmission or storage. Mostly, the decrease in file size and also the loss in information is achieved by quantization of parameters describing the picture properties and hence, the coarser the quantization the worse the quality and the smaller the compressed picture. The quality of the compressed picture is commonly estimated by a comparison of the compressed picture with the underlying original picture. This allows estimating a signal-to-noise ratio, wherein the noise is understood to be the noise introduced during the compression.

Figure 7:
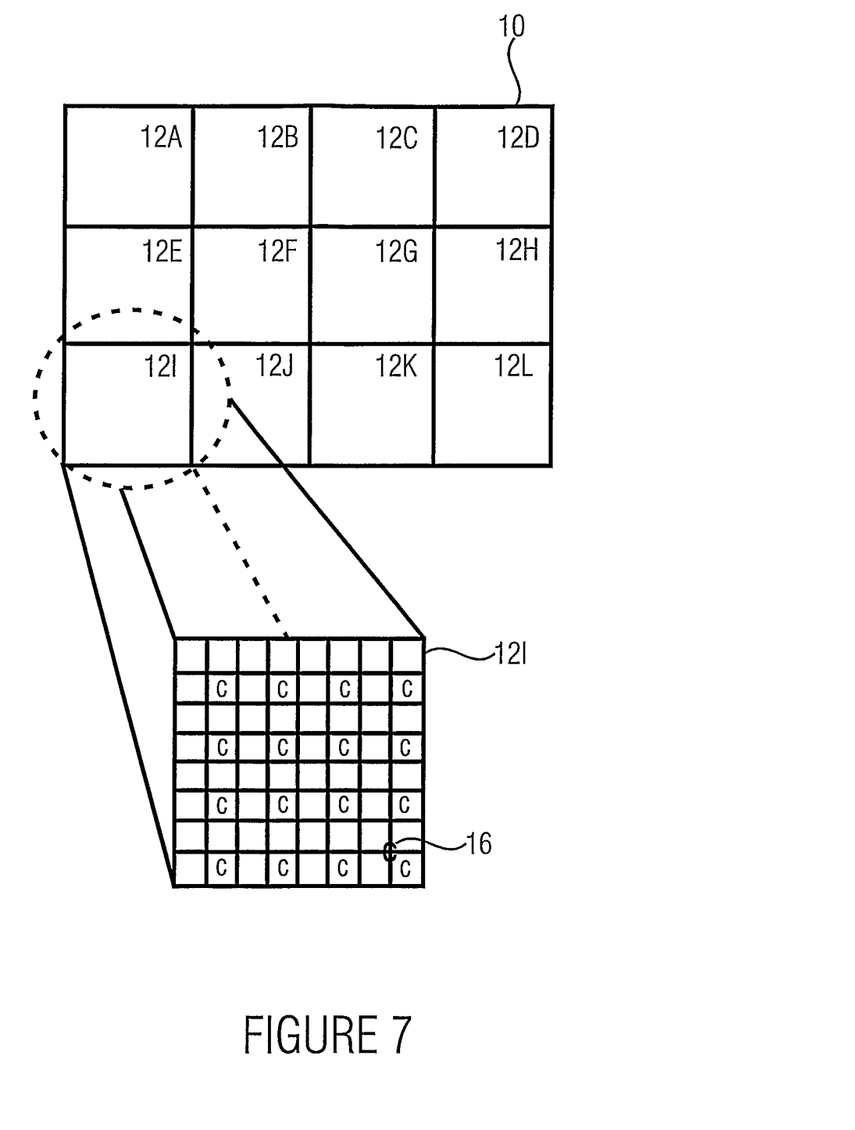
FIG. 7 shows block-wise decomposition of a picture for subsequent picture processing.

In current compression algorithms, a block-wise processing of images is widely used. The underlying basic idea is that for normal image content, a change of content, e.g. of color and brightness, of neighboring pixels is normally relatively small. Therefore, by using areas of neighboring pixels that are processed and compressed together, one should achieve rather high compression rates without significantly reducing the perceptual quality of the picture. Such a picture block is from here on also referred to as macro-block. Thus, in other words, the macro-blocks serve as a kind of sub-picture unit in coding. The block-subdivision is illustrated in FIG. 7, where a picture 10 is subdivided into 12 equally sized picture blocks 12A to 12L. The subdivision into 12 different picture blocks is to be understood as an example only.

As an example, a single picture block 12 I is magnified in FIG. 7, wherein the subdivision of the picture block 12 I into an 8×8 matrix shows the single pixel elements building the macro-block 12I. Also here, the formation of a picture block from 8×8 individual pixels is to be understood as an example only. To represent color within each individual pixel, each pixel is assigned three parameters holding different color information in a certain color space.

One simple approach of encoding a macro-block is to quantize the three parameters of each single pixel and to perform an entropy coding on the quantized parameters after the quantization. Since quantization significantly reduces the available parameter space for the entropy coding, quantization of the parameters can already reduce the amount of storage space or bits needed to describe one macro-block significantly.

However, in order to reduce the amount of syntax elements describing the picture content having high energy, the picture information within one macro-block is often described by transformation coefficients, generated by transforming the picture content within the macro-blocks into another representation (spectral domain). One example is to perform a discrete cosine transformation, eventually on a sub-macro-block level, and to use the transformation coefficients as the image information, which may then be quantized and which might also be entropy coded after quantization.

The transformation may, for example, be applied to the complete pixel information, i.e. three parameter values per pixel of the picture block 12I. Advantageously, the transformation is performed separately for the three parameters/components.

For further reduction of file sizes and higher compression, one may also make use of a property of the human eye, which seems to put more weight on brightness information than on color information when judging the perceptual quality of an encoded picture. Therefore, one possibility to enhance the coding performance (with respect to quality and bit rate) is to reduce the number of color parameters with respect to the number of brightness parameters within a macro-block. That is, the information basis, on which a representation based of transformation coefficients is based, contains more information on brightness within the picture block than on color. Since there are numerous ways to describe a color by one single brightness-value and two color-values, the brightness-value shall be referred to as luma-value and the color-values shall be referred to as chroma-values from here on.

One possible way of building such a picture block 12I, suited to be transformed, is indicated in FIG. 7. The magnified picture block 12I has 8×8 individual pixels, each pixel normally described by one luma and two chroma values. FIG. 12I exemplifies a way to reduce the amount of chroma-information in that only the chroma information of specific pixels is used as the data set underlying the transformation. This is indicated by the letter C within each individual pixel that is part of the chroma-data set. On the contrary, the most important luma information of every individual pixel is used.

It is to be understood that the situation shown in the magnified macro-block 12I is an example only. It is also possible to further reduce the amount of chroma information. This could, for example, be achieved by omitting every second chroma information, that is for every eight luma values, one chroma value would be taken into account during the transformation. It would also be possible to not simply use the chroma-values of the pixels shown in FIG. 12A but to calculate an average chroma value from four neighboring pixels by averaging the chroma value of the pixels. Such a chroma value would then be assigned to a position within the macro-block that is lying in the center of the four underlying pixels, as indicated by chroma value 16 indicated in FIG. 7.

The encoding techniques described above can generally be used for both still images and moving pictures. For moving pictures, more sophisticated methods of encoding are used, involving motion estimation.

In case of macro-block-wise motion estimation, two (or more) pictures of a picture stream (the pictures do not necessarily have to directly follow each other) are located which show the same picture content in the two images. In the simplest case, the picture content within the macro-block of a current frame has not changed compared to the reference frame. However, the content of the macro-block may appear at a slightly different position in the reference frame. In this case it is sufficient to know the motion vector of the movement of the picture content during the transition from the reference picture to the macro-block of the current picture to reconstruct or predict the picture information of the picture block in the current picture, once the reference picture is completely known at the decoder side. Of course, normally there are slight changes within the picture block during the transition from the reference picture to the current picture. Due to this, the prediction error is also transmitted thereby allowing to reconstruct the change of picture content in the macro-block along with the motion vector, to allow for a complete reconstruction of the macro-block in the current picture. Codecs which use motion prediction with subsequent residual coding such as transformation and entropy coding are called hybrid video codecs.

According to state of the art techniques, predictive coding allows for an efficient representation of picture sequences. In predictive coding, first a value for a quantity to be coded is predicted and then only the difference of the really observed value to the predicted value is coded and transmitted. This will also yield a gain in bit rate, since having a reliable prediction, the difference parameters will on the average be smaller than the absolute parameters describing the picture within the macro-block. Hence, the symbol space on which a subsequent entropy coding (with or without preceding quantization) is based can be decreased, allowing for shorter code words and such for a reduction in bit-rate.

Although there have been quite some efforts undertaken to decrease the file size of compressed pictures or movies which are compressed using block-wise coding strategies without unacceptably decreasing the perceptual quality of the compressed content, the properties of the single picture blocks are still not exploited optimally with respect to different parametric representations of picture blocks.

SUMMARY

According to an embodiment, a decoder for reconstructing a picture represented in an entropy encoded representation having a first and a second picture block, the picture blocks carrying picture information for picture areas smaller than the area of the picture, wherein the first picture block is carrying the picture information in a first color-space representation and the second picture block is carrying the picture information in a second color-space representation, may have: an entropy decoder for deriving the first and second picture blocks using an entropy decoding rule; and a color-space transformer for transforming either the color-space representation of the first picture block to the second color-space representation or the color-space representation of the second picture block to the first color-space representation.

According to another embodiment, an encoder for generating a representation of a picture having a first and a second picture block, the picture blocks carrying picture information for picture areas smaller than the area of the picture in a first color-space representation, may have: a color-space transformer for deriving transformed picture blocks, the color-space transformer adapted to transform the picture information of one of the first and the second picture blocks to a second color-space representation; and an entropy encoder for deriving an entropy encoded representation of the transformed picture blocks according to an entropy encoding rule.

According to another embodiment, a method of decoding a picture represented in an entropy encoded representation having a first and a second picture block, the picture blocks carrying picture information for picture areas smaller than the area of the picture, wherein the first picture block is carrying the picture information in a first color-space representation and the second picture block is carrying the picture information in a second color-space representation, may have the steps of: entropy decoding the entropy encoded representation for deriving the first and second picture blocks using an entropy decoding rule; and transformation of either the color-space representation of the first picture block to the second color-space representation or the color-space representation of the second picture block to the first color-space representation.

According to another embodiment, a method of generating a representation of a picture having a first and a second picture block, the picture blocks carrying picture information for picture areas smaller than the area of the picture in a first color-space representation, may have the steps of: transformation of the picture information of the first or of the second picture block to a second color-space representation to derive transformed picture blocks; and entropy encoding the transformed picture blocks for deriving an entropy encoded representation of the transformed picture blocks according to an entropy encoding rule.

According to another embodiment, a parameter bit stream may have an entropy encoded representation of a picture having a first picture block and a second picture block, the picture blocks carrying picture information for picture areas smaller than the area of the picture, wherein the first picture block is carrying the picture information in a first color-space representation and the second picture block is carrying the picture information in a second color-space representation.

Another embodiment may have a computer program for performing, when running on a computer, the method of decoding a picture represented in an entropy encoded representation having a first and a second picture block, the picture blocks carrying picture information for picture areas smaller than the area of the picture, wherein the first picture block is carrying the picture information in a first color-space representation and the second picture block is carrying the picture information in a second color-space representation, wherein the method may have the steps of: entropy decoding the entropy encoded representation for deriving the first and second picture blocks using an entropy decoding rule; and transformation of either the color-space representation of the first picture block to the second color-space representation or the color-space representation of the second picture block to the first color-space representation.

Another embodiment may have a computer program for performing, when running on a computer, the method of generating a representation of a picture having a first and a second picture block, the picture blocks carrying picture information for picture areas smaller than the area of the picture in a first color-space representation, wherein the method may have the steps of: transformation of the picture information of the first or of the second picture block to a second color-space representation to derive transformed picture blocks; and entropy encoding the transformed picture blocks for deriving an entropy encoded representation of the transformed picture blocks according to an entropy encoding rule.

The present invention is based on the finding that pictures or a picture stream can be encoded highly efficient when a representation of pictures is chosen that has different picture blocks, with each picture block carrying picture information for picture areas smaller than the full area of the picture, and when the different picture blocks carry the picture information either in a first color-space representation or in a second color-space-representation. Since different color-space-representations have individual inherent properties with respect to their describing parameters, choosing an appropriate color-space-representation individually for the picture blocks results in an encoded representation of pictures that has a better quality at a given size or bit rate.

In one embodiment of the present invention, an inventive decoder is used, that receives a bit stream having different picture blocks, the picture blocks carrying picture information either in a first color-space-representation or in a second color-space-representation. The decoder further receives a transformation flag, indicating whether the color-space-representation of the picture block presently operated on is to be transformed into a different color-space-representation or not. Such a decoder allows for the reconstruction of image blocks within an image decoding process that are encoded in different color-space-representations. The decoder is therefore operative to process an inventive bit stream which allows for a more compact representation of a picture or a picture stream without decreasing the picture quality.

In a further embodiment of the present invention, an inventive decoder is used which is operative to process picture blocks in a RGB-representation and in a representation, in which the color and the brightness information is stored by separate parameters, i.e. a representation having one luma-parameter and two chroma-parameters. This is advantageous in that normally image material is present in the RGB-color-space and can therefore be processed by the inventive decoder. Additionally, inherent differences of the parameter values of different color-space representations can be advantageously made use of to provide an optimal reproduction quality at a given bit rate.

In a further embodiment of the present invention, an inventive decoder has a color-space transformer that is operative to perform the color-space-transformation on a parametric representation of the picture blocks, wherein the parametric representation describes the picture block in a transform domain, for example in a frequency domain. This has the great advantage that in conventional picture processing, picture data is normally transformed prior to transmission to allow for an efficient quantization. Therefore, an inventive decoder that is operative to also work in the transform domain can be easily implemented into conventional designs to further increase the coding efficiency of those designs.

In a further embodiment of the present invention, an inventive decoder is integrated into a picture or video decoder that further has a requantizer and an entropy decoder. Such, the inventive decoder can be used within the picture or video decoder to further increase the coding efficiency in that a video decoder or a picture decoder having an inventive decoder is enabled to process inventive, highly compressed bit streams.

In a further embodiment of the present invention, an inventive decoder is operative to switch the color-space-transformation on and off depending on a transformation flag present in a provided bit stream. Such an inventive decoder can therefore be implemented into conventional designs and allows both conventional decoding and decoding inventive bit streams within one single device.

In a further embodiment of the present invention an inventive encoder is having a color-space-transformer for transforming the color-space-representation of picture blocks from a "natural" color-space-representation (i.e. the color-space representation in which the content is originally created) to a secondary color-space-representation when a transformation decider is indicating the desired transformation. The transformation decider is operative to estimate, on a block basis, the expected quality of the encoded picture representation when the respective blocks are encoded in the natural color-space-representation or in the secondary color-space-representation. The inventive transformation decider is therefore also operative to decide whether a transformation is needed or appropriate for the individual blocks on the basis of a desired maximum bit rate and hence choosing the best possible coding quality at a given bit rate. This has the great advantage that implementing the inventive concept allows for lower bit rates than conventional techniques while preserving the same perceptual quality.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
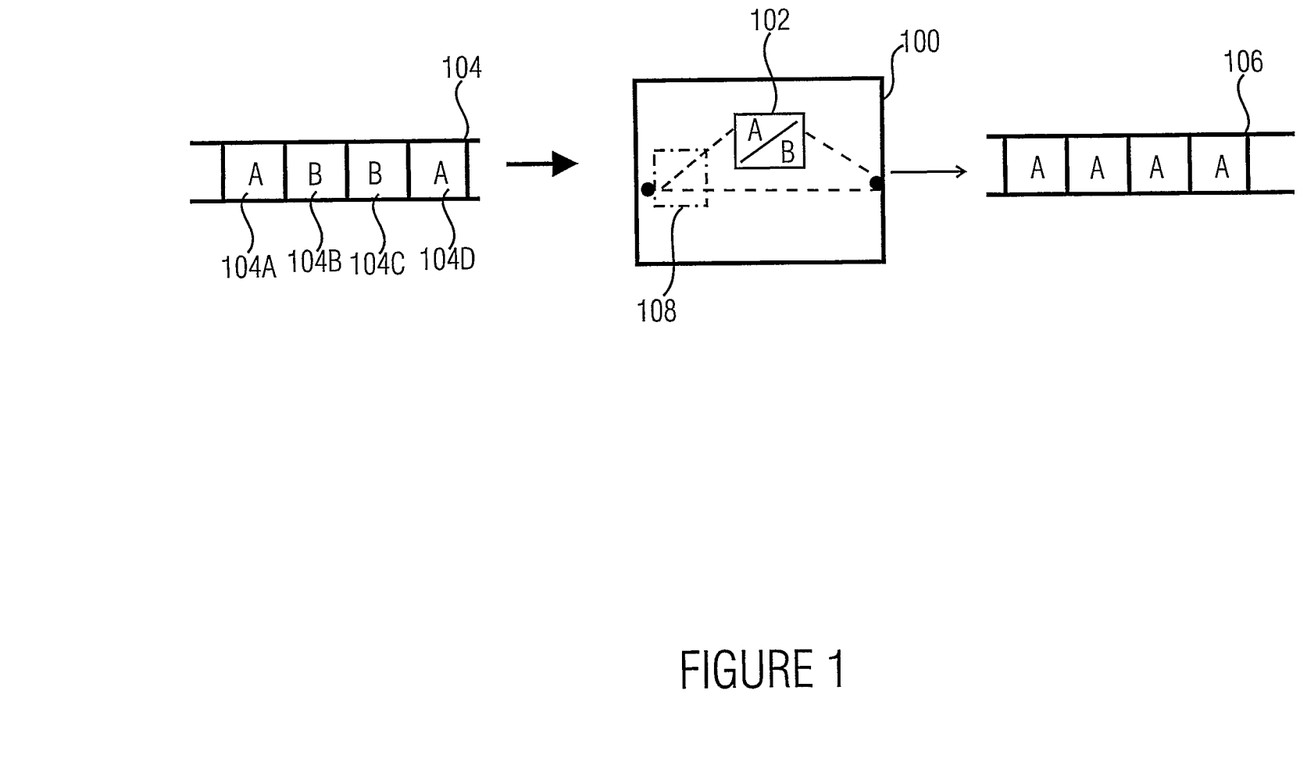
FIG. 1 shows an embodiment of an inventive encoder.

FIG. 1 shows an inventive decoder 100. The decoder 100 is having a color-space transformer 102 that is operative to transform a picture block from a first color-space-representation (A) to a second color-space-representation (B) and vice versa. The decoder is used within the reconstruction of a picture or a movie that is represented in a representation having a first picture block and a second picture block within pictures, wherein the picture blocks carry their picture information in a first color-space-representation (A) or in a second color-space-representation (B). The decoder 100 receives a bit stream 104 comprising several picture blocks 104A to 104D as an input, wherein the picture blocks 104A to 104D are included within the bit stream 104 in different color-space-representations A or B.

The color-space transformer 102 within the decoder 100 receives selected picture blocks to convert them from their original color-space-representation to a desired color-space-representation. As can be seen by the output bit stream 106 of the decoder 100, in the example given in FIG. 1, the color-space transformer is operative to transform the color-spacerepresentation (B) of the picture blocks 104C and 104B to color-space-representation A such that after the decoding all picture blocks within the output stream 106 are represented in the color-space-representation A.

In a modification of FIG. 1, the decoder 100 can furthermore comprise a flag receiver 108 for receiving a transformation information transmitted within the bit stream that indicates whether a corresponding picture block has a color-space-representation that shall be transformed or not. Depending on the received transformation indication, the flag receiver 108 can either direct a picture block to the color-space transformer or directly to the output of the decoder (100).

Although in an advantageous embodiment an inventive decoder receives a transformation indication signal with the bit stream, it is also possible to implement a decoder that recognizes by some recognition algorithm, whether a color-space transformation is required or not for a certain picture block. This could, for example, be derived from the picture block element representation itself.

In a further embodiment of the present invention an inventive decoder is operative to receive an additional activation flag that is activating or deactivating the color-space transformer for a number of consecutive frames (slices) or, more general, for larger groups of picture blocks.

It is a further advantageous embodiment of the present invention to implement the inventive decoder in a video decoder which is operative to receive a bit stream signal that is comprising picture information of picture blocks that are encoded in a predictive coding scheme based on motion estimation of picture blocks.

In such a predictive coding scheme, only the difference or residual (difference macro-blocks) between the motion-compensated prediction for the picture blocks and the actual content of the picture blocks is transmitted to increase the encoding efficiency. In one embodiment of the present invention, these differential macro-blocks are transmitted and decoded either in a primary (e.g. RGB) or in a secondary (e.g. YCoCg) color-space-representation. Therefore, the already rather compact information describing the differential picture blocks can be further decreased by a simple color transformation, which is computationally cheap. When it comes to coding of differential signals i.e. signals that are intended to have describing parameters of low values (i.e. small numbers), the effect of a color-space transformation may be extremely beneficial. This will shortly be motivated in the following description of FIGS. 2 and 3.

In the context of residual signals, the present invention describes a technique for switching between a primary (e.g. RGB) and a secondary (e.g. YCoCg) color-space in order to adapt the color-space-representation of the prediction residual signal to the characteristics of the given video source and the specific coding conditions at hand. By using the inventive concept and techniques, an encoder may choose between two alternative color representations of the residual signal for each single macro-block (picture-block) in a rate-distortion optimal way. The encoder's choice may be signaled to a corresponding decoder by means of a macro-block-based flag. In an advantageous embodiment of the present invention, the inventive concept may be applied to advanced video codecs such as H.264/MPEG4-AVC and is particularly useful to reduce the demanded bit rate in high-quality coding scenarios of those advanced codecs. A rate-distortion optimal way may be understood such that, for example, a maximum bit rate for a bit stream is specified and an inventive encoder is operative to choose the color-space-representation of the residual signal that provides the best encoding quality at the specified bit rate. However, it is also possible to optimize the rate for a fixed quality or optimize a R/D ratio by use of some cost function.

Figure 2:
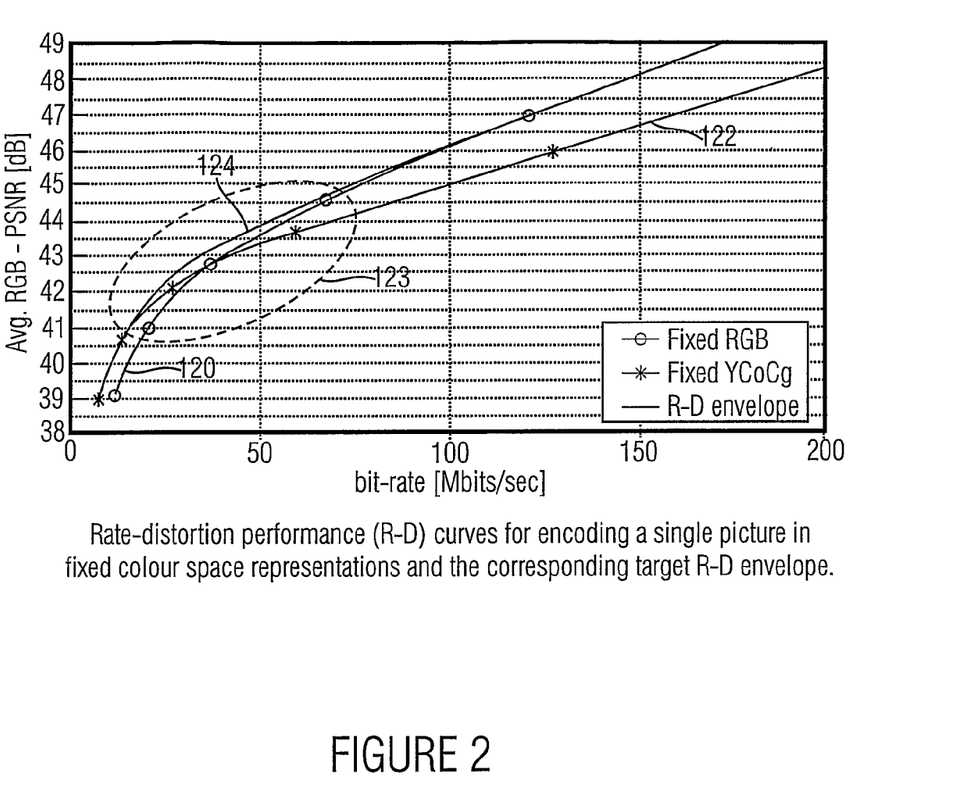
FIG. 2 shows a bit rate versus quality graph of different color-space-representations.

The quality-bit rate dependency is, for a single sample frame, plotted in FIG. 2.

As can be seen, a specified maximum bit rate is given on the x-axis (in units of Mbits/Sec) and the corresponding image quality (signal-to-noise ratio in units of dB) is plotted on the y-axis. FIG. 2 shows two so called "rate-distortion performance curves" for encoding a single picture in two different fixed color-space-representations. The first curve 120 shows the rate dependency of the picture when RGB is chosen as color-space-representation and the second curve 122 shows the rate-distortion performance when YCoCg is chosen as color-space-representation. FIG. 2 shows the known effect that a single color-space-representation cannot be optimal (in a rate-distortion sense) for all different source picture characteristics. In general, the amount of correlation between the R, G and B channels is highly signal dependent and may even change within a given picture.

FIG. 2 shows the rate-distortion (R-D) curves for a typical intra-only coding scenario, where the color-space-representations have been fixed before encoding. Curve 120 represents the R-D performance obtained for the case of encoding in the original RGB domain, while encoding of the same source in the YCoCg color-space results in an R-D performance shown by FIG. 122. It may be noted that the distortion (D) in the plot has been measured as the average of the R, G, and B picture peak signal-to-noise ratio values, that is by comparing the original picture with the additional noise introduced by the encoding.

It may be noted that the curves in FIG. 2 represent averaged data for a complete picture. The effects discussed in the following paragraphs with respect to bit rate may be much more dominant when observed for single macro-blocks since averaging effects then do not occur and the difference of the quality achieved by using different color-space-representations on the single macro-block level may even be bigger.

As can be seen from the R-D curves 120 and 122 in FIG. 2, low bit rate encoding using the YCoCg representation performs significantly better than that using the corresponding RGB representation. On the other hand, RGB-based encoding leads to an increasingly better performance when moving towards higher bit rates with more and more noise components getting encoded. As a consequence, there is a crossover region 123 indicating a sub-optimal R-D performance of both alternative representations since in either case, for encoding the sample in a single color-space-representation one can only move along one or the other R-D curve. Using an inventive decoder 100 and a corresponding inventive encoder, the present inventive concept solves this problem and is achieving a coding performance corresponding to curve 124, which is the R-D envelope of both the RGB-based and YCoCg-based R-D curves.

Moreover, in many coding applications neither the specific coding conditions nor the typical characteristics of the source are known beforehand. Using the inventive decoder and corresponding inventive encoders, the optimum color-space-representation can be adaptively chosen to be optimum in a rate-distortion sense.

Figure 3:
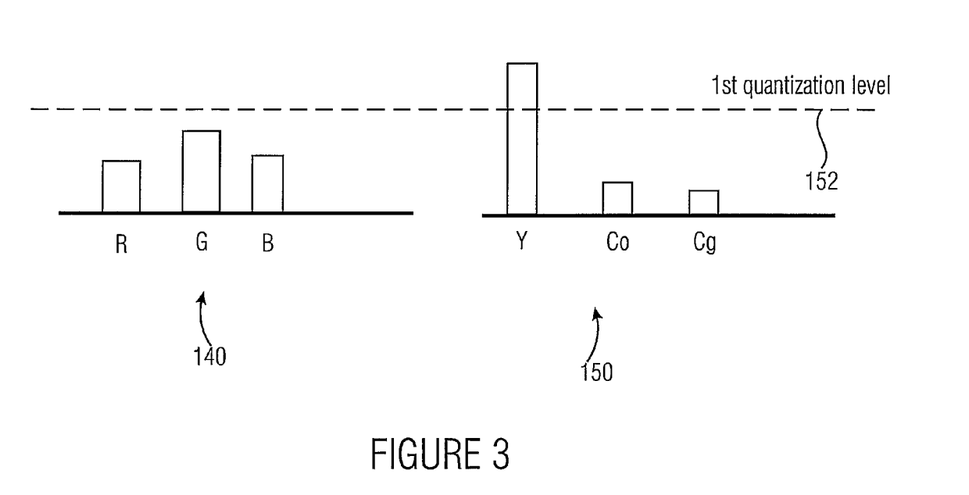
FIG. 3 shows an example for a color-space-transformation emphasizing the inventive concept.

FIG. 3 gives an example for a conversion of a nearly gray signal from the RGB-color-space to the YCoCg-color-space to further explain the inventive concept and the mechanisms leading to a potential decrease in bit rate. The color transform from the RGB to the YCoCg color-space-representation can be performed in a reversible way by applying the following operations to each triple of (R, G, B) or (Y,Co,Cg) values, respectively:

$$\begin{array}{ll} Co = R - B & t = Y - (Cg >> 1) \\ t = B + (Co >> 1) & G = Cg + t \\ Cg = G - t & B = t - (Co >> 1) \\ Y = t + (Cg >> 1) & R = B + Co. \end{array}$$

In the above notation, the operator (>>) means bitwise movement of the underlying bit-string to the right and is thus equivalent to a division by 2.

It may again be noted that the inventive idea does not depend on the exact choice of the color-space-representations to switch between. In the given examples, the restriction to the cited color-space-representations is mainly because of the fact that they are widely used.

FIG. 3 shows a graphical representation of a color-space transformation from the RGB color-space to the YCoCg color-space. The original RGB-signal 140 exemplarily has nearly equally valued R, G and B parameters, i.e. the corresponding pixel is nearly gray with an intensity proportional or depending on the sum of the RGB values. Since the pixel in question is nearly colorless, a transformation to the YCoCg color-space does provide parameter values that are close to zero for the chroma parameters Co and Cg, resembling the fact that the signal is nearly colorless. On the other hand, the luma parameter Y is having a rather big value compared to the chroma parameters.

The example shown in FIG. 3 shows a content that is predominantly less color saturated in which the usage of a decorrelating color transform from RGB to, for example, YCoCg may be very helpful in terms of overall coding efficiency since in that case the corresponding tristimulus values (values of the single information channels within one color-space-representation) are closer to being equal to one another. If within one picture, the color saturation is rather low, the individual RGB values might differ to some extend. The sum, i.e. the Y-parameter of the YCoCg-representation may then be varying smoothly over the image, and, due to the low color saturation, the Co and Cg parameters are rather small. Such smoothly or nearly constant parameters can be encoded more efficiently.

Such, the effectiveness of a color transform may be highly dependent on the specific coding conditions. This is especially true for sources that contain a high amount of signal-independent, uncorrelated noise in the primary channels. The color transform from RGB to YCoCg, when written in a matrix form, has matrix elements off the diagonal that are rather significant in value. The "amplification" of the Y-channel above a quantization threshold 152, which is shown for illustrative purposes only, is directly connected to these off-diagonal elements. Therefore, for the sources containing a high amount of signal-independent, uncorrelated noise, the significant off-diagonal elements of a decorrelating color transform may cause a severe amplification of the noise, which in turn results in a degradation of coding efficiency in the high bit-rate range where the noise components typically are supposed to survive the quantization process.

As mentioned before, with respect to FIGS. 2 and 3, it can be extremely beneficial to adapt the color representation to the characteristics of the given prediction residual signal on a macro-block by macro-block (picture-block by picture-block) basis. Therefore, within a bit stream comprising the prediction residual signals, a new syntax element could be introduced in the bit stream. That syntax element could for example, when being equal to one, indicate encoding and decoding of the given macro-block involving the application of the color-space transformation by invoking the corresponding forward and inverse transform operations shown before. That introduced flag could, when being equal to zero or not present, further mean that the encoding and decoding process proceeds in the same way as already specified before, i.e. based on the original color space that existed before encoding.

Figure 4:
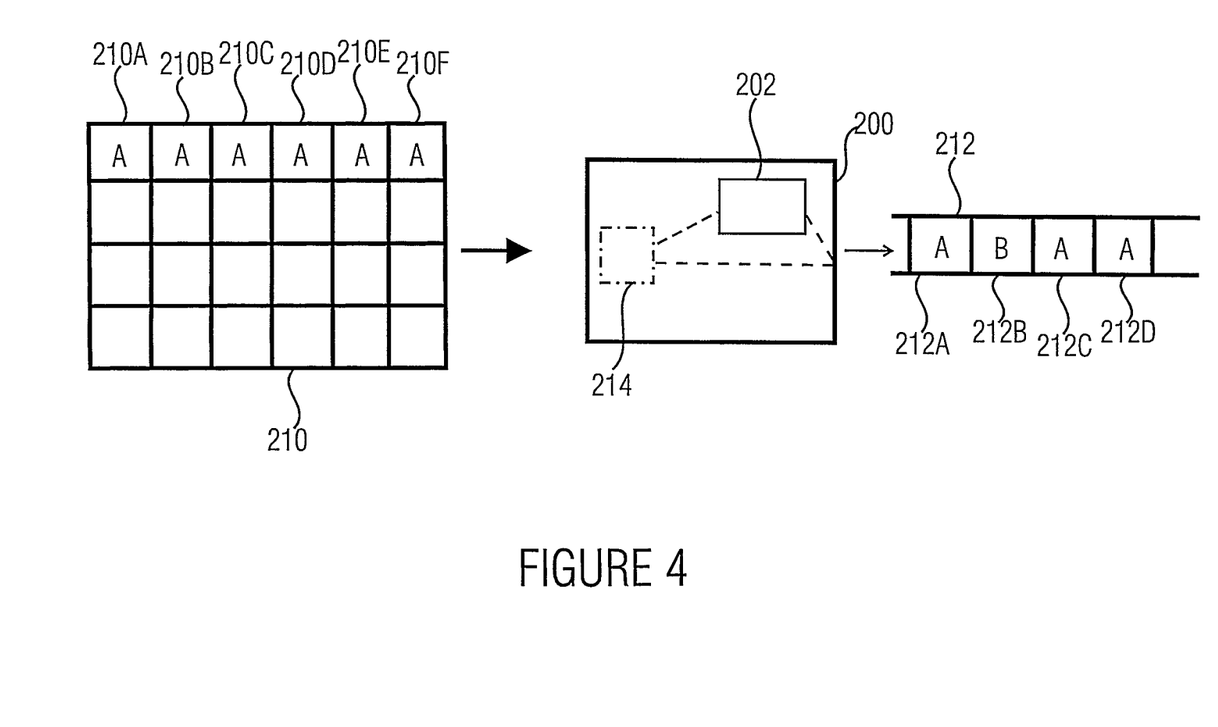
FIG. 4 shows an embodiment of an inventive encoder.

FIG. 4 shows an inventive encoder 200 for generating a representation of a picture having multiple picture blocks that are carrying picture information for picture areas that are smaller than the area of the full picture 200. The encoder 200 has a color-space transformer 202 for transforming the picture information of picture blocks from a first color-space representation (A) to a second color-space representation (B).

Encoding the picture on a picture-block basis, the individual picture-blocks 210A to 210F are input into the inventive encoder 200. The encoder outputs encoded picture blocks either in a first color-space representation (A) or in a second color-space representation (B).

The encoder 200 may further comprise a transformation decider 214 that decides on a picture-block by picture-block basis, whether the transformation for the processed picture-block shall be performed. The transformation decider 214 can, for example, meet the transformation decision based on a maximum allowable bit rate, choosing the color-space representation providing the best possible quality at the given bit rate.

Another possibility would be to define a desired maximum quality (closely connected to the coarseness of quantization), i.e. a desired distortion value, and the transformation decider 214 is working on a try and error basis, where the individual picture-blocks are generally encoded in both color-space representations and the transformation decider 214 is choosing the color-space transformation resulting in the lower bit rate. Of course, every other decision rule may be used by the transformation decider, for example, based on analytical expressions or estimations based on previously tabulated sample configurations. The inventive encoder 200 may furthermore be operative to incorporate transformation information indicating a desired transformation for a given picture block to the bit stream also having the information on the picture blocks. This signals to a corresponding decoder, whether a color-space transformation is to be performed on the decoder side or not.

When introducing such an additional flag as proposed before to signal whether the color-space transformation is to be performed for a macro-block in question or not, further bit rate can be saved by entropy encoding this introduced flag, for example called mb_rct_flag ("macroblock residual color transform flag"). To achieve an efficient coding, an arithmetic coding concept can, for example, be applied to code the binary data. Therefore, the chosen arithmetic coding could be a binary arithmetic coding concept, relying on the probability of occurrence of values 0 or 1 per bit (or per mb_rct_flag concerning a specific macro-block). Furthermore, it would, for example, be advantageous to implement the binary arithmetic coding in an adaptive manner, i.e. in a way that the underlying probability distribution of the arithmetic coding algorithm is "learning" or updated in dependence on the actual occurance of mb_rct_flag's already having been encoded. That is, that the probabilities of the occurrence of the single bit values are updated once a real value is observed and thus the underlying probability distribution is adapted to the actual.

Figure 4A:
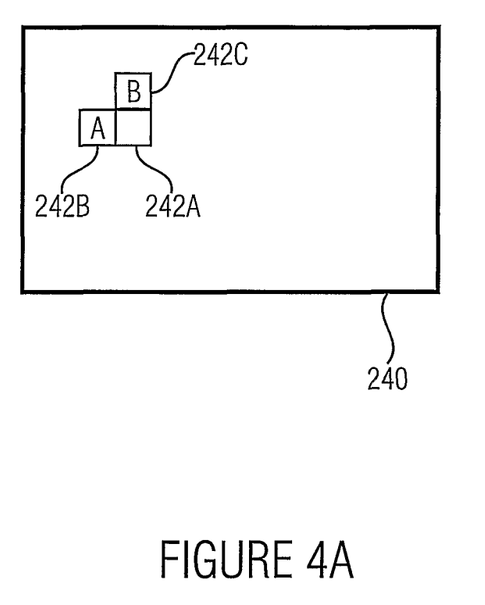
FIG. 4A shows an example of a given context for context based coding.

Furthermore, the adaptive binary arithmetic coding can also be implemented in a context sensitive manner, i.e. different probability distributions are at hand for different defined contexts. In other words, more than one context could be spent for mb_rct_flag. One example of a context description is shown in FIG. 4A where, within a picture 240, three macro-blocks 242a, 242b and 242c are shown. If, for example, macro-block 242a is to be encoded, the context, i.e. the environment condition of the macro-block to be coded, could be derived by the neighboring left (a) macro-block 242b and by the neighboring upper (b) macro-block 242c. Based on the mb_rct_flag's of these macro-blocks, 3 different contexts ctxIdxInc can be berived by the following expression:

$$ctxIdxInc(C)=(mb\_rct\_flag\,(A)==0)?0?1+ \\ (mb\_rct\_flag\,(B)==0)?0:1.$$

According to an alternative notation, this could be written as:

$$ctxIdxInc(C)=mb\_rct\_flag\,(A)+mb\_rct\_flag\,(B).$$

It should be noted that, as already mentioned above, the mb_rct_flags do not necessarily have to be present for each individual macro-block. It is to be supposed that the flag is equal to 0 when not present for the evaluation of the above formula.

One may, for example, further foresee an additional functionality, which is also signaled by a flag "rct_mode_flag". This flag can switch the color-space-transformation on and off for a greater sample of macro-blocks that are forming, for example, a slice of macro-blocks that shares together some other distinct properties. Only if rct_mode_flag is equal to 1, mb_rct_flag's shall be present in the macro-block layer.

Figure 5:
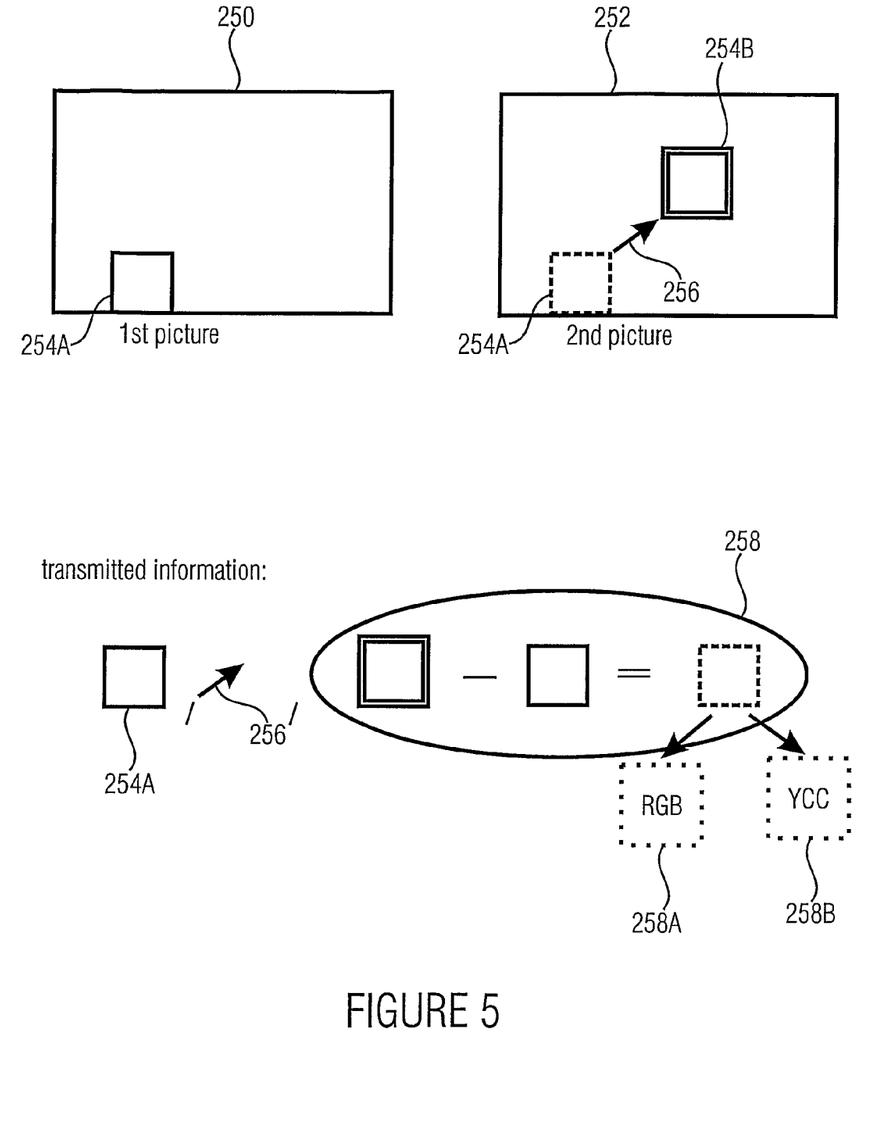
FIG. 5 shows an example of an encoding concept for an embodiment of an inventive encoder.

FIG. 5 illustrates, for a simplified example, the encoding process using motion estimation and predictive residual coding. The encoding shall be shortly explained on a basis of two consecutive pictures 250 and 252. Motion estimation is presented with the help of a sample macro-block 254A in picture 252.

The picture content of the macro-block 254A is also found during a motion estimation step in the picture 252, called reference picture. In the reference picture the corresponding macro-block 254B is displaced by a motion vector 256 from its position 254A in picture 252. In case the macro-block 254B has not changed its content at all, a straightforward way for deriving the picture portion of picture 252 that corresponds to the position of the macro-block 254B would be to simply transmit the motion vector 256 within a bit stream. This enables a decoder to reconstruct picture-block 254B at the appropriate position, when the decoder has knowledge of the preceding picture 250.

In a more general scenario, the picture content of the macro-block 254B will have changed with respect to the picture content of the corresponding area 254A in the reference picture 250. In predictive coding, only the difference of the prediction 254A to the actual content 254B is transmitted, since the residual samples are expected to be small and therefore can be coded using low bit rate. Thus, in addition to the macro-block 250A and the motion vector 256 the residual signal 258 has to be computed and used for a representation of the finally transmitted signal. According to the present invention, the finally transmitted signal can either be transmitted in a first color-space representation 258A or in a second color-space representation 258B depending on the bit rate or bandwidth of a transmission channel available.

It is noted here that having a single motion vector for all three signal components (e.g. R, G and B), i.e. the reference information is derived from the same block of the same reference picture, is the simplest possible case. In a more general approach, different motion vectors for each signal component can be derived, i.e. the reference information is derived from different picture blocks, that can additionally originate from different reference pictures. The present invention is thus not necessarily restricted to the case of having one motion vector, i.e., the same prediction operator for all three components. It is for example an advantageous embodiment of the present invention to have one single motion vector.

As already mentioned above, the application in a macro-block based coding scheme using predictive residual coding is an advantageous application scenario, since then the required bit rate can advantageously be further decreased by simple and computationally cheap color-space transformations.

Figure 6:
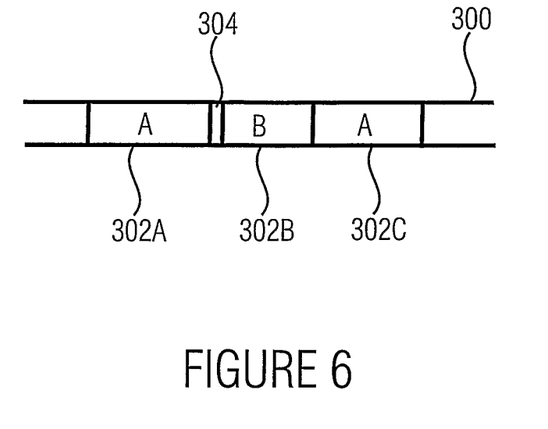
FIG. 6 shows an example of an inventive bit stream.

FIG. 6 shows an inventive bit stream 300 having multiple bit stream representations of picture-blocks 302A to 302C that can be provided in a first color-space representation (A) or in a second color-space representation (B). The inventive bit stream can be used by an inventive decoder allowing for a highly compressed transmission of a compressed picture or a compressed picture sequence by a transmission channel, that may be wired, wireless, or the like. Of course the storage of an inventive bit stream on a computer-readable storage medium is also possible, having the advantage of requiring only little storage space. The bit stream may further comprise indication information 304 indicating the desired color-space-transformation of picture-block 302B.

Although the previously described embodiments of the present invention have been described mainly using the RGB and YCoCg-spaces, the present invention is not at all limited to the use of those color-spaces. In a further embodiment, arbitrary other color-spaces or other means of decorrelating inter-color techniques may be used and it is even possible to provide an inventive encoder or decoder capable of transforming between three or more different color-space representations.

Although the present invention has been mainly described with respect to video coding, it may also advantageously be used for coding of still images. Furthermore, the number of samples may be varied.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

The invention claimed is:

1. A decoder for reconstructing a picture represented in an entropy encoded representation having a first and a second picture block, the picture blocks carrying picture information for picture areas smaller than the area of the picture and, by describing the picture information by transformation coefficients, generated by transforming a picture content within the picture areas into a spectral domain, wherein the first picture block is carrying the picture information in a first color-space representation and the second picture block is carrying the picture information in a second color-space representation, the decoder comprising:

an entropy decoder arranged to derive the first and second picture blocks using an entropy decoding rule; and a color-space transformer arranged to perform a transformation of either the color-space representation of the first picture block to the second color-space representation onto the transformation coefficients of the first picture block or the color-space representation of the second picture block to the first color-space representation onto the transformation coefficients of the second picture block.

2. The decoder in accordance with claim 1, in which the color-space transformer is further operative to process transformation indication information indicating a desired transformation for a picture block; and in which the decoder further comprises a flag receiver arranged to receive the transformation indication information.

3. The decoder in accordance with claim 1, in which the color-space transformer is operative to process the RGB-color-space and a second color-space representation comprising one luma-parameter indicating a brightness and two chroma parameters indicating a chromatic composition of a signal.

4. The decoder in accordance with claim 3, in which the color-space transformer is operative to perform the color-space transformation between the RGB-color-space described by parameters R, G, and B and the second color-space representation described by the luma parameter Y and the chroma parameters Cg and Co according to the following formulas:

$$Co = R - B \qquad t = Y - (Cg >> 1)$$
$$t = B + (Co >> 1) \qquad G = Cg + t$$
$$Cg = G - t \qquad \Leftrightarrow \qquad B = t - (Co >> 1)$$
$$Y = t + (Cg >> 1) \qquad R = B + Co.$$

5. The decoder in accordance with claim 1, in which the entropy decoder further comprises a requantizer arranged to derive the first and the second picture block from a quantized representation of entropy decoded picture information.

6. The decoder in accordance with claim 1, in which the entropy decoder is operative to use an entropy decoding rule comprising the use of a Variable-length-code book.

7. The decoder in accordance with claim 1, in which the entropy decoder is operative to use an entropy decoding rule comprising the use of a binary arithmetic coding algorithm.

8. The decoder in accordance with claim 1, in which the entropy decoder is operative to use a decoding rule having one or more sub-rules chosen depending on a decoding context.

9. The decoder in accordance with claim 1, in which the decoder is operative to reconstruct the picture using information from reference pictures of a picture stream, which are temporarily preceding or following the picture within the picture stream and that are represented using related picture blocks corresponding to the picture blocks of the picture, the related picture blocks having picture information on the same picture content as the picture blocks, wherein a positional change between the picture blocks and the corresponding picture blocks of the reference pictures with respect to a fixed location of the given picture blocks can be described by motion vectors.

10. The decoder in accordance with claim 9, in which the decoder is operative to reconstruct the picture blocks using the corresponding picture blocks and differential picture blocks predicting a change in picture information of the picture blocks with respect to the corresponding picture blocks.

11. The decoder in accordance with claim 9, further comprising an input interface arranged to receive a bit stream representation of the picture stream having the information of the single pictures of the picture stream.

12. The decoder in accordance with claim 1, wherein the decoder is configured to reconstruct the picture using the first and the second picture block.

13. The decoder in accordance with claim 1, in which the color-space transformer is further operative to process bypass information indicating a sequence of picture blocks and to switch off color-space transformation for the sequence of picture blocks indicated by the bypass information.

14. An encoder for generating a representation of a picture having a first and a second picture block, the picture blocks carrying picture information for picture areas smaller than the area of the picture in a first color-space representation, the encoder being configured to transform picture content within the picture areas into a spectral domain so that each picture block describes the picture information by transformation coefficients, the encoder comprising:

a color-space transformer arranged to perform a transformation of the picture information of one of the first and the second picture blocks to a second color-space representation onto the transformation coefficients of the one of the first and the second picture blocks; and an entropy encoder arranged to derive an entropy encoded representation of the first and second picture blocks, the picture information of the one of the first and the second picture blocks which is transformed to the second color-space representation, according to an entropy encoding rule.

15. The encoder in accordance with claim 14, in which the color-space transformer is operative to transform the first or the second picture block for optimizing a rate-distortion ratio of the entropy encoded representations of the transformed picture blocks using a cost function.

16. The encoder in accordance with claim 15, further comprising an output interface arranged to output a bit stream having the picture information including the entropy encoded representations of the transformed first and the second picture blocks.

17. The encoder in accordance with claim 14, in which the color-space transformer is operative to process a transformation information indicating a picture block to be transformed; and the encoder is configured to generate the transformation information using a decision rule.

18. The encoder in accordance with claim 17, in which the transformation decider is operative to use a decision rule that is selecting the picture block requiring less information units when transformed to the second color-space representation.

19. The encoder in accordance with claim 18, in which the transformation decider is operative to use a decision rule that is selecting the picture block in a rate-distortion optimal way.

20. The encoder in accordance with claim 14, further comprising a motion estimator adapted to derive motion vectors indicating a positional change between related picture blocks and the picture blocks, the related picture blocks being contained within reference pictures of a picture stream and having picture information on the same picture content as the picture blocks, wherein the reference pictures temporarily precede or follow the picture within the picture stream.

21. A method of decoding a picture represented in an entropy encoded representation having a first and a second picture block, the picture blocks carrying picture information for picture areas smaller than the area of the picture and, by describing the picture information by transformation coefficients, generated by transforming a picture content within the picture areas into a spectral domain, wherein the first picture block is carrying the picture information in a first color-space representation and the second picture block is carrying the picture information in a second color-space representation, the method comprising:

entropy decoding the entropy encoded representation for deriving the first and second picture blocks using an entropy decoding rule; and performing a transformation of either the color-space representation of the first picture block to the second color-space representation onto the transformation coefficients of the first picture block or the color-space representation of the second picture block to the first color-space representation onto the transformation coefficients of the second picture block.

22. A method of generating a representation of a picture having a first and a second picture block, the picture blocks carrying picture information for picture areas smaller than the area of the picture in a first color-space representation, the method comprising:

transforming picture content within the picture areas into a spectral domain so that each picture block describes the picture information by transformation coefficients;

performing a transformation of the picture information of one of the first and the second picture blocks to a second color-space representation onto the transformation coefficients of the one of the first and the second picture blocks; and entropy encoding the transformed picture blocks for deriving an entropy encoded representation of the first and second picture blocks, the picture information of the one of the first and the second picture blocks which is transformed to the second color-space representation, according to an entropy encoding rule.

23. A non-transitory computer readable medium storing a computer program for performing, when run on a computer, the method of decoding a picture represented in an entropy encoded representation having a first and a second picture block, the picture blocks carrying picture information for picture areas smaller than the area of the picture and, by describing the picture information by transformation coefficients, generated by transforming a picture content within the picture areas into a spectral domain, wherein the first picture block is carrying the picture information in a first color-space representation and the second picture block is carrying the picture information in a second color-space representation, the method comprising:

entropy decoding the entropy encoded representation for deriving the first and second picture blocks using an entropy decoding rule; and performing a transformation of either the color-space representation of the first picture block to the second color-space representation onto the transformation coefficients of the first picture block or the color-space representation of the second picture block to the first color-space representation onto the transformation coefficients of the second picture block.

24. A non-transitory computer readable medium storing a computer program for performing, when run on a computer, the method of generating a representation of a picture having a first and a second picture block, the picture blocks carrying picture information for picture areas smaller than the area of the picture in a first color-space representation, the method comprising:

transforming picture content within the picture areas into a spectral domain so that each picture block describes the picture information by transformation coefficients;

performing a transformation of the picture information of one of the first and the second picture blocks to a second color-space representation onto the transformation coefficients of the one of the first and the second picture blocks; and entropy encoding the transformed picture blocks for deriving an entropy encoded representation of the first and the second picture blocks, the picture information of the one of the first and the second picture blocks which is transformed to the second color-space representation, according to an entropy encoding rule.

25. A decoder for reconstructing a picture represented in an entropy encoded representation having a plurality of picture blocks, the picture blocks carrying picture information for picture areas smaller than the area of the picture, wherein each picture block carries the picture information for a respective picture area either in a first color-space representation or a second color-space representation, the decoder comprising:

an entropy decoder arranged to derive the first and second picture blocks using an entropy decoding rule;

flag receiver arranged to receive a transformation indication information in a form of a syntax element for each picture block, the syntax element indicating in which of the first color-space representation and the second color-space representation the respective picture block carries the picture information for the respective picture area; and a color-space transformer either configured to transform the first color-space representation of picture blocks for which the respective syntax element indicates that the respective picture block carries the picture information for the respective picture area in the first color-space representation to the second color-space representation, or configured to transform the second color-space representation of picture blocks for which the respective syntax element indicates that the respective picture block carries the picture information for the respective picture area in the second color-space representation, to the first color-space representation so that, after the transformation, all picture blocks are represented in an equal one of the first and second color-space-representations wherein the picture information is described by transformation coefficients generated by transforming a picture content within the picture areas into a spectral domain.

26. An encoder for generating a representation of a picture having a plurality of picture blocks, the picture blocks carrying picture information for picture areas smaller than the area of the picture in a first color-space representation, the encoder comprising:
   a color-space transformer arranged to transform the picture information of a subset of the plurality of picture blocks to a second color-space representation; and
   an entropy encoder arranged to derive an entropy encoded representation of the plurality of picture blocks according to an entropy encoding rule so that, in the encoded representation, the picture blocks of the subset of picture blocks carry the picture information for the respective picture area in the second color-space representation, and picture blocks disjointed to the subset carry the picture information for the respective picture area in the first color-space representation, and so that a transformation indication information in a form of a syntax element is provided for each picture block, the syntax element indicating in which of the first color-space representation and the second color-space representation the respective picture block carries the picture information for the respective picture area wherein the picture information is described by transformation coefficients generated by transforming a picture content within the picture areas into a spectral domain.

* * * * *

UNITED STATES PATENT AND TRADEMARK OFFICE
CERTIFICATE OF CORRECTION

PATENT NO. : 8,446,960 B2 Page 1 of 1
APPLICATION NO. : 12/159802
DATED : May 21, 2013
INVENTOR(S) : Marpe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1259 days.

Signed and Sealed this
Eighth Day of September, 2015

Michelle K. Lee
*Director of the United States Patent and Trademark Office*